United States Patent
Reeb

(10) Patent No.: US 7,805,430 B2
(45) Date of Patent: Sep. 28, 2010

(54) EVALUATION OF NAME PREFIX AND SUFFIX DURING A SEARCH

(75) Inventor: Andreas Reeb, Schifferstadt (DE)

(73) Assignee: SAP AG, Walldorf (DE)

( * ) Notice: Subject to any disclaimer, the term of this patent is extended or adjusted under 35 U.S.C. 154(b) by 220 days.

(21) Appl. No.: 11/317,820

(22) Filed: Dec. 22, 2005

(65) Prior Publication Data

US 2007/0150438 A1 Jun. 28, 2007

(51) Int. Cl.
G06F 17/30 (2006.01)
G06F 15/173 (2006.01)
G06F 15/16 (2006.01)
G06F 15/177 (2006.01)

(52) U.S. Cl. .......................... 707/708; 709/238; 709/206; 715/236

(58) Field of Classification Search .................. None
See application file for complete search history.

(56) References Cited

U.S. PATENT DOCUMENTS

| | | | | |
|---|---|---|---|---|
| 5,706,365 A * | 1/1998 | Rangarajan et al. | ......... | 707/102 |
| 5,832,480 A * | 11/1998 | Byrd et al. | ............ | 707/5 |
| 6,430,557 B1 * | 8/2002 | Gaussier et al. | ............. | 1/1 |
| 6,557,004 B1 * | 4/2003 | Ben-Shachar et al. | ....... | 707/102 |
| 6,772,139 B1 * | 8/2004 | Smith, III | ............... | 707/3 |
| 6,963,871 B1 * | 11/2005 | Hermansen et al. | ........... | 707/6 |
| 6,985,926 B1 * | 1/2006 | Ferlauto et al. | ............. | 709/206 |
| 7,143,090 B2 * | 11/2006 | Spalink et al. | ................ | 707/5 |
| 7,302,492 B1 * | 11/2007 | Day | ............................ | 709/238 |
| 2002/0161757 A1 * | 10/2002 | Mock et al. | .................... | 707/5 |
| 2003/0078915 A1 * | 4/2003 | chaudhuri et al. | ............... | 707/3 |
| 2004/0006558 A1 * | 1/2004 | Dehlinger et al. | ............... | 707/3 |
| 2004/0139070 A1 * | 7/2004 | Dysart et al. | .................... | 707/3 |
| 2005/0171934 A1 * | 8/2005 | Yuknewicz et al. | ............ | 707/3 |
| 2005/0182756 A1 * | 8/2005 | Eppley et al. | .................. | 707/3 |
| 2005/0267877 A1 * | 12/2005 | Chaudhuri et al. | ............. | 707/3 |

FOREIGN PATENT DOCUMENTS

| | | |
|---|---|---|
| EP | 0381418 A | 8/1990 |
| WO | 02075600 A | 9/2002 |

OTHER PUBLICATIONS

Beverly Seavey; A Relational Database for Sequence-specific Protien NMR data; 1991; Springer Netherlands; ISSN 0925-2738; pp. 1-15.*
Borgmann, C. L., et al., "Getty's Synoname and its cousins: A Survey of Applications of Personal Name-Matching Algorithms", Journal of the American Society for Information Science, American Society for Information, Aug. 1992, pp. 459-476, vol. 3, No. 7, Washington, DC.
European Patent Office, European Search Report, Jul. 7, 2007, Rijswijk, Netherlands.

* cited by examiner

*Primary Examiner*—Neveen Abel Jalil
*Assistant Examiner*—Jermaine Mincey
(74) *Attorney, Agent, or Firm*—Kenyon & Kenyon LLP

(57) ABSTRACT

Disclosed is a method, system, and computer readable medium for evaluating a string input for a name. Exemplary embodiments categorize the words within the input string into different fields and using relationships between the different fields provide more accurate search results during a name search.

35 Claims, 7 Drawing Sheets

|  | Value | Index |
|---|---|---|
| (1) | DR. VAN MULLER BARON | 0 |
| (2) | DR. VAN MULLER | 10 |
| (3) | DR. VAN | 8 |
| (4) | DR. | 5 |
| (5) | VAN MULLER BARON | 0 |
| (6) | VAN MULLER | 10 |
| (7) | VAN | 8 |
| (8) | MULLER BARON | 0 |
| (9) | MULLER | 10 |
| (10) | BARON | 0 |

FIG. 2a

|   | Field | Data Type | Length | Short Description |
|---|-------|-----------|--------|-------------------|
| 1 | ART   | CHAR      | 1      | Type of name affix |
| 2 | TITLE | CHAR      | 15     | Name affix |

FIG. 2b

| ART | Description |
|-----|-------------|
| 'S' | academic title after name |
| 'T' | academic title before name (e.g. Dr.) |
| 'V' | Aristocratic prefixes between first and second name (e.g. von, van) |
| 'Z' | Aristocratic titles between first and second name (e.g. Baron, Count) |

FIG. 2c

| ART | TITLE |
|---|---|
| S | MBA |
| S | P.ENG. |
| S | MD |
| S | PH.D. |
| S | D.D.S. |
| S | DDS |
| S | LL.B. |
| S | LLB |
| S | LL.M. |
| S | LLM |
| S | JD |
| S | ESQ. |
| S | CPA |
| S | C.P.A. |
| T | DR. ———— 200 |
| T | DR.MATH. |
| T | DR.MED. |
| T | DR.MED. |
| T | MANAGER |
| T | MGR. |
| T | MR. |
| T | PROF. |
| T | PROF. DR. |
| V | VAN ———— 201 |
| V | VAN 'T |
| V | VAN DE |
| V | VAN DEM |
| V | VAN T |
| V | VON |
| Z | BARON ———— 202 |
| Z | SENIOR |
| Z | THE FOURTH |
| Z | IV |
| Z | THE 4$^{TH}$ |
| Z | TRUCHSESS |

FIG. 2d

EVALUATION OF NAME PREFIX AND SUFFIX DURING A SEARCH

BACKGROUND

Searching through databases is becoming more complex as storage capacity is increased and more information can be stored. With databases that contain large amounts of information, particularly about people, the amount of retrievable names can be significant. Furthermore, many people have variations on names, particularly in affixes, that make their names difficult to search. Many people also have similar names or similar surnames. Searching for a common name may lead to a large processing time. In addition, a result list returned to a user may be too large, may not contain variations of certain parts of names, may contain redundant names, or may be inaccurate. The large amount of information in a person's name, and the various parts to a person's name, are currently not utilized in helping to narrow the field of search for a name. At the same time, requiring a user to input parts of a person's name into separate search fields respectively corresponding to those parts may be confusing to a user and requires more time than entering the complete name in a single field. There is also a possibility of human error if part of a name is placed in the wrong field. Thus, a method is needed to increase the number of variables that is searchable without increasing the complexity of the user input.

BRIEF DESCRIPTION OF THE DRAWINGS

FIG. 2*a* illustrates an example lookup table.

FIG. 2*b* illustrates an example list of the fields in a customizing table.

FIG. 2*c* illustrates an example description of the fields in a customizing table, including the various types of affixes.

FIG. 2*d* illustrates an example customizing table.

DETAILED DESCRIPTION

In order to decrease the number of entries in a result list from a database search, differentiation between name parts is utilized to get more exact hits. In order to not confuse a user and allow flexibility, rather than presenting a user with multiple fields representing parts of names, a user can enter the name once, and an embodiment parses the name. An embodiment may take permutations of the name and places them into a lookup table. As the embodiment traverses the index of the lookup table, each permutation of the name is checked against a customizing table, which contains a list of all possible affixes in the name database. An affix may be any subpart of a name, e.g., a suffix, prefix, etc. Different parts of the name are found by iterating through a lookup table and determining affix type by searching through a customizing table. One advantage of the procedure performed by the embodiment is to identify all affixes (such as "Dr.", "Van", etc.) that are in an input name string. Once this information on the parts of the name is identified, it is used to retrieve names (and any other corresponding information) from the name database. The result list may then be returned to the user. This procedure may be used when the entire name is entered into a single field.

Figure 1:
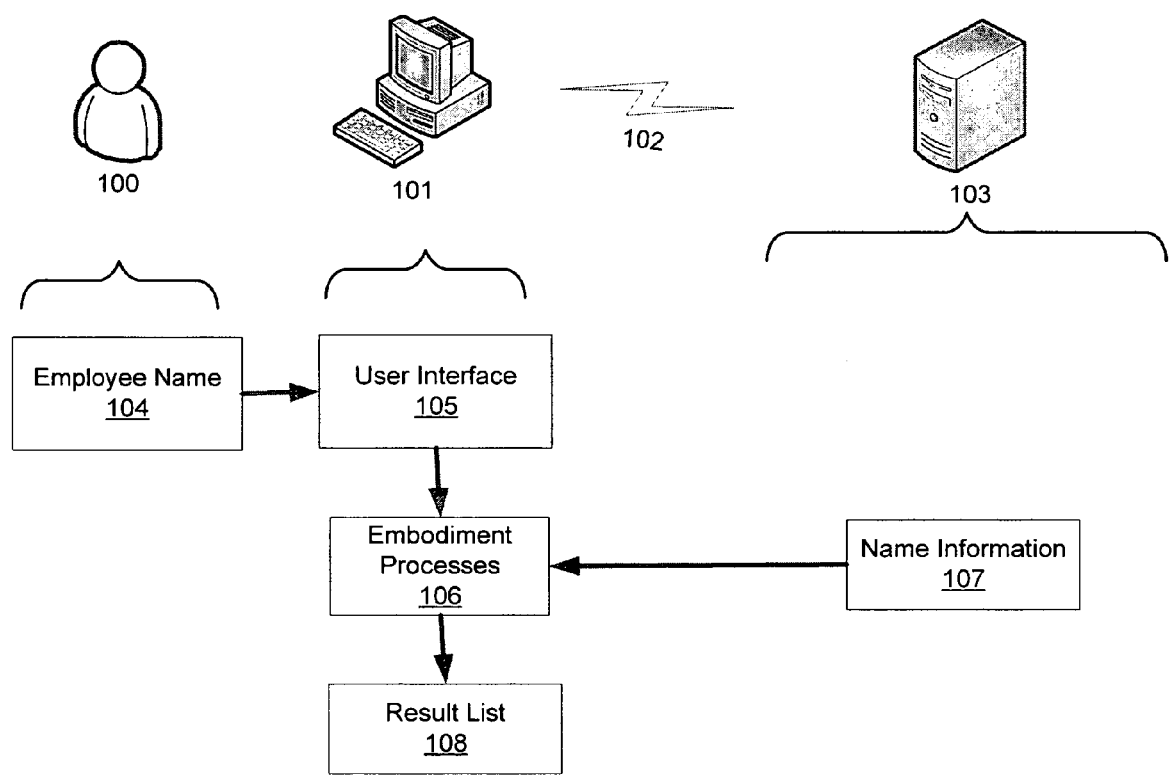
FIG. 1 illustrates a possible configuration of a system capable of using an embodiment of the invention.

FIG. 1 illustrates a possible configuration of a system capable of using an embodiment of the invention. A user 100 inputs an employee name 104 into a user interface 105 on a computing device 101. The computing device 101 takes the input and the embodiment processes the information 106 and communicates with a server 103 over a communication medium 102 to retrieve a result list 108 which is returned to the user 100. The computing device 101 can be any hardware that has processing or computational capability, such as a laptop, handheld device, etc. The communication medium 102 can be either intranet or internet and over a wireless or wired communication (e.g. ethernet cable). The server 103 can hold database information, and one can distribute the functional modules of an embodiment across one or more server computers 103 as appropriate.

FIG. 2*a* illustrates an example lookup table. The lookup table is created from an example input string "Dr. Van Muller Baron". All possible permutations of the name are placed in the lookup table under the heading "Value." The numbers in the left-most column indicate the index number of all the strings, and the right-most column under the heading "Index" represents the index number to place a marker indicating the next value to be read if the current "value" in that row is found in the customizing table. The marker is the placeholder of an embodiment to allow it to keep track of which "value" is being processed. The "0" index value means to "exit" the lookup table search, indicating that there are no more values to be processed, or that all the values have been processed. However, any value may be used to indicate that the search can be exited as long as the number is not an index number in the lookup table. The "Index" number indicating the next number is done by determining the index that evaluates a string containing the remaining words that are left if one of the words is found. For example, if the value "Dr." is found in the customizing table then the corresponding Index is "5", meaning that the next value to be processed possibly contains any permutation of the remaining value of "Van Muller Baron."

FIG. 2*b* illustrates an example list of the fields in a customizing table. The customizing table contains two fields in this example embodiment, either the "ART" field or a "TITLE" field. The descriptions are also in the figure. The data type indicates the storage type of the fields, and in this example embodiment they are both of type "CHAR" meaning characters. Length in this example would be the number of characters, and in this case the "ART" field is a single character while the "TITLE" may be as long as 15 characters. This is adjustable depending on the information that is found in the customizing table.

FIG. 2*c* illustrates an example description of fields that may be in a customizing table, including the various types of affixes. For example, the single 'S' character is a suffix that represents an "academic title after name," such as the "M.D." for a medical doctor or the "Esq." for esquire that comes after a lawyer's name. A 'T' character represents a prefix indicating that it is an "academic title before name," such as a "Dr." string used to indicate those that are medical doctors or doctors of philosophy (a.k.a. a Ph.D. or philosophiae doctor). A user may change the types of characters representing various affixes in the description of fields, as well as in the customizing table.

FIG. 2d illustrates an example customizing table. The customizing table may contain not only affixes that are common in names, but also variations of spelling for the affixes. For example, the suffix "the Second" may appear as "II" or "the 2nd" or "the $2^{nd}$". Also, the academic title "MD" for medical doctor may also exist in the customizing table as "M.D.". The title "Ph.D." may also be listed as "PhD." Having variations on affixes allows for an embodiment to account for alternative (or even commonly mistaken) spellings of affixes. All the affixes in the example are listed together in a single customizing table, as shown by the example ART: 'T' corresponding to the value "Dr." 200, 'V' corresponding to the value "Van" 201, and 'Z' corresponding to the value "Baron" 202. However, a customizing table may also be divided into different tables by affix type.

Figure 3:
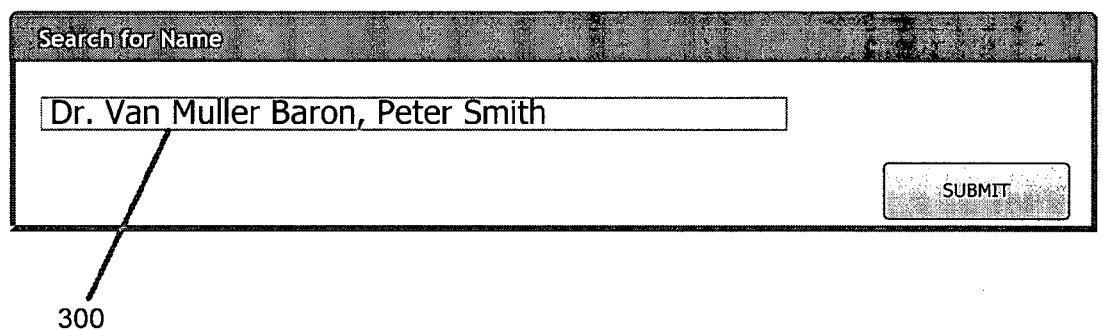
FIG. 3 illustrates an example user input box in a user interface.

FIG. 3 illustrates an example user input box in a user interface. A user interface searching for names will have a single input 300, rather than multiple inputs. This is because the embodiment will process the name to separate the name into its various parts and then return the result list based on its parsing and search of the name. The example in FIG. 3 has the name "Dr. Van Muller Baron, Peter Smith." The embodiment would automatically parse out the First Name, "Peter", and the Middle Name "Smith" leaving only the various affixes and parts of the Last Name. The lookup table for the remaining string "Dr. Van Muller Baron" is already in the example lookup table provided in FIG. 2a.

Figure 4:
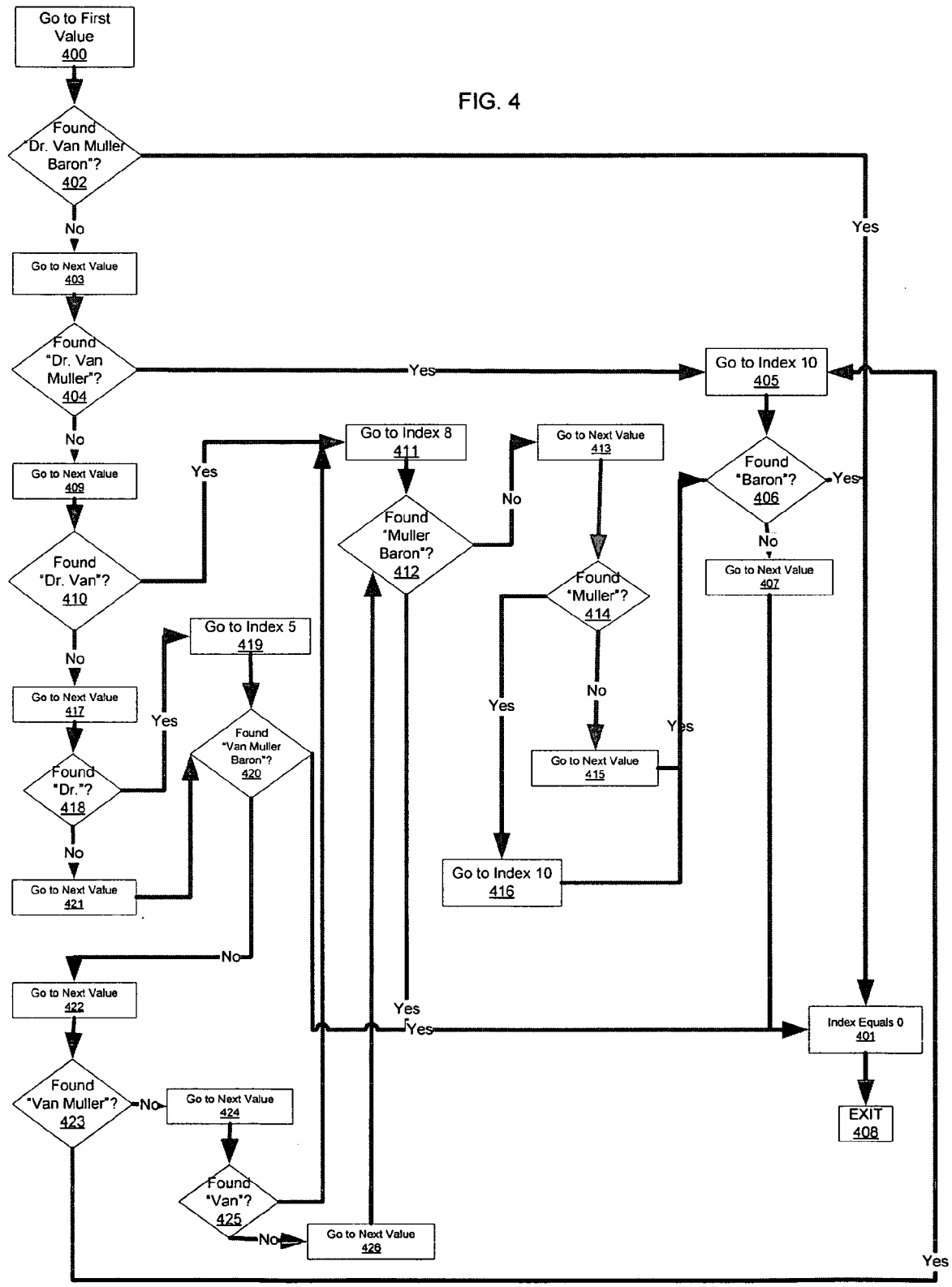
FIG. 4 illustrates the example logic that may be performed in order to determine the parts of the name input in the example input box of FIG. 3 using the example lookup table of FIG. 2*a* and the example customizing table in FIG. 2*d*.

FIG. 4 illustrates the example logic that may be performed in order to determine the parts of the name input in the example input box of FIG. 3 using the example lookup table of FIG. 2a and the example customizing table in FIG. 2d. Starting at Step 400 the first value is queried, in this case the value is "Dr. Van Muller Baron." If "Dr. Van Muller Baron" was in the customizing table 402, then Step 401 would be executed because the corresponding index is "0" 401 and the lookup table search would exit 408, meaning that the parsing and separation of the name into parts has been completed. However, in this example, "Dr. Van Muller Baron" is not in the customizing table and thus the next value is queried 403. If the value at the next index, "Dr. Van Muller", was in the customizing table 404, the corresponding index is "10" 405, the marker of the embodiment would be "10" and the value at "10" would be the next value searched. However, "Dr. Van Muller" is not found in the customizing table, thus, the next value is queried 409 and the embodiment would search the customizing table for the value "Dr. Van" 410. If the value "Dr. Van" were found in the customizing table 410, then the corresponding index would equal "8" 411, the marker would be at "8", and the value at "8," which is "Muller Baron," would be searched in the customizing table. In this example, "Dr. Van" is also not in the customizing table and the next value is queried 417. The next value "Dr." is found in the customizing table 418 as an affix of ART 'T' 200. Thus the corresponding index is "5" 419 and the marker would be at "5"; however, one can note that even if "Dr." were not found in the customizing table, the next value searched 421 would have been at index "5".

Since the value "Dr." has been found, the embodiment now has to determine whether the rest of the name has any particular affix values. Thus the remaining values are essentially all permutations of the original string "Dr. Van Muller Baron" without the string that was already found "Dr.", leaving all the permutations of the word "Van Muller Baron". The value "Van Muller Baron" is the value at index "5" and had it been found in the customizing table 420, the corresponding index and marker would be "0" 401 and the search could exit 408. However, the value "Van Muller Baron" is not in the customizing table, and the next value queried 422 is "Van Muller", which is also not found in the customizing table. Had "Van Muller" been found 423 then the index would be "10" and the marker would be placed at "10". However, the value "Van Muller" is not in the customizing table and the next value queried 424 is "Van". The embodiment would query the value "Van" in the customizing table 425 and since it exists as the affix of ART 'V', the index would be "8" and the marker would be "8"; however, one can again note that even if "Van" were not found in the customizing table, the next value searched 426 would have been at index "8".

The value at index "8" is "Muller Baron." If "Muller Baron" were found in the customizing table 412, the index would be "0" 401 and the search could exit 408. However, the value "Muller Baron" is not in the customizing table, and the next value queried 413 is "Muller", which is also not in the customizing table. However, one can note that whether "Muller" is found 414 is irrelevant because had "Muller" been in the customizing table, the marker would have pointed to index "10" 416. The next value queried 415 is "Baron." If "Baron" were not in the customizing table 406, as it is the last entry the next value in the index 407 is automatically index "0" 401, and the search would exist 408. However, "Baron" does exist in the customizing table as the affix of ART 'Z' and the index marker is now "0" 401 meaning the search exits 408.

Figure 5:
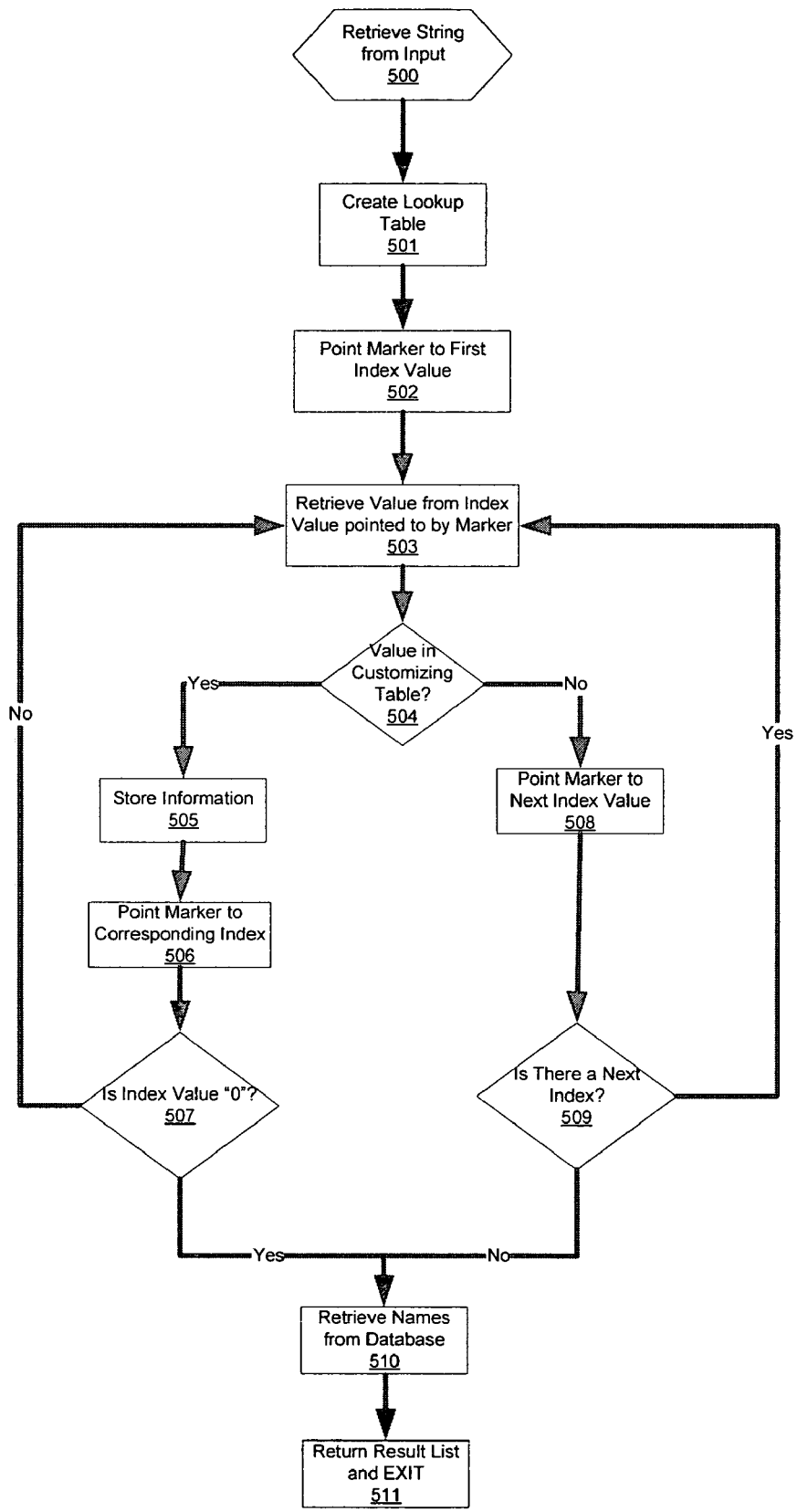
FIG. 5 illustrates the general logic that may be used by an embodiment of the system to return a result list given a string, in this example, the string is a name.

FIG. 5 illustrates the general logic that may be used by an embodiment of the system to return a result list given a string, in this example, the string is a name. First, an embodiment would retrieve string from an input 500, similar to that of FIG. 3. Next, a lookup table would be created 501, similar to that of FIG. 2a. Next, an embodiment would point a marker to the first index value 502 and then perform a recursive search step on the lookup table. An embodiment would retrieve a value from the index row to which it is pointing 503. If the current value were in a customizing table 504, then the relevant field information of that value would be temporarily stored 505, the marker would be given the number in the corresponding index. If the index was "0" 507 then the embodiment would exit out of the search. The exit value does not necessarily have to be a "0". It need only be a unique identifier that is not an index number that exists in the lookup table.

If the current value were not in the customizing table, then the marker would be incremented to the next value 508. If there were not a next index value 509 then the lookup table search would exit, otherwise the next value would be queried 503 and the search would repeat in the remaining values in the lookup table.

Once the lookup table search is complete, the information stored in step 505 is used to retrieve names from the database 510. Also, any parts of a name that were not found in the customizing table may by default be listed in the last name field. Of course, the default information may be adjustable depending on the information found in the database or adjustments by a user.

Since the information stored provides the corresponding fields, each part of the name would not have to be searched in all the fields of a database table. Thus, an advantage of the embodiment is not only to save both the user the hassle of inputting various strings into multiple search fields, but also to save the system resources by reducing the amount of fields of a table searched. For example, if the value "Dr." is known to be a prefix of ART 'T', then only names that contain an academic title before the name would be potential matches. The "Dr." value would not be searched in the suffix fields of the database. Furthermore, if the ART 'V' value "Van" were determined, then this information would only be used to whittle down the remaining names that are possible matches.

Thus, among names with "Dr.", the remaining list would only be names that also contained an aristocratic prefix between the first and second name with the value "Van." This would continue until all the information is matched with the result list. The result list is provided to the user and the embodiment exits 510.

An advantage of an embodiment is that with a reduced list of names found, a user would make less calls to the database for all the information that corresponds to the names returned. Furthermore, the result list may be returned as a list of full names, or the result list can return a list broken down by the various parts of the name. An advantage of the result list is that the information is expandable so that if other search engines have input fields that are broken down by parts of names, the user would have this information.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A method for searching for a name in a database, comprising:
   inputting a name as a character input string, the name comprising an affix and at least one of a first name, second name, and a last name, into only one input field;
   parsing the character input string taken from the one input field into a plurality of permutations of the input string;
   in response to the parsing, creating a lookup table having each of the plurality of permutations of the input string parsed from the input string;
   iterating through the lookup table, the lookup table having an index value assigned to each of the plurality of permutations of the input string, the index value pointing to a next entry in the lookup table;
   based on a successful comparison between the permutation of the input string in the lookup table and a customizing table, selecting first values from the customizing table including values related to the input string permutation on the iteration of the lookup table, wherein the customizing table contains affixes that are common in persons names;
   identifying a next entry in the lookup table using an index value associated with the permutation of the name according to the comparison to the customizing table, if the index value of the identified next entry is an exit condition, exit the comparison of the customizing table;
   if the identified next entry has an index value assigned to a permutation of the input string, making another comparison between the next entry from the lookup table and the customizing table, selecting second values from the customizing table;
   searching a database for the input string into the input field using, if the index value of the identified next entry was an exit condition, the selected first value, otherwise, using the selected first value and the selected second value;
   returning a result list from the database; and
   presenting the result list on an output device.

2. A method according to claim 1, wherein the lookup table contains string values.

3. A method according to claim 2, wherein the string values are the permutations of the names within the character input string.

4. A method according to claim 3, wherein the index values are numbers used to determine the next string value to search in the lookup table if a current string value is not found in the customizing table.

5. A method according to claim 1, wherein the each first value is an affix.

6. A method according to claim 1, wherein the words in the character input string that are not found in the customizing table are last names.

7. A method according to claim 1, wherein the second values are names.

8. A method according to claim 7, wherein the second values are information corresponding to the names.

9. The method of claim 1, wherein the customizing table includes all name affixes from a name database.

10. The method of claim 1, wherein the selected first value is temporarily stored.

11. The method of claim 1, wherein the number of index values is limited to a total number of permutations of the input string.

12. The method of claim 1, wherein the identified next entry in the lookup table is an exit value indicating an instruction to exit the lookup table.

13. A system comprising:
   a database for storing names and affixes to names;
   a display for returning a result list comprised of the plurality of second values selected from the database; and
   a computing device for:
      receiving a name as a first character input string into only one input field, the name comprising an affix and at least one of a first name, a middle name, and a last name;
      parsing the first character input string taken from the one input field into a plurality of permutations of the input string;
      in response to the parsing, creating a lookup table having each of the plurality of permutations of the name parsed from the first character input string;
      iterating through the lookup table, the lookup table having an index value associated with each of the plurality of permutations of the name, the index value pointing to a next entry in the lookup table, wherein the customizing table contains affixes that are common in persons names;
      based on a comparison between the permutation of the input string in the lookup table and a customizing table, selecting first values from the customizing table including a second character input string related to the name permutation on the iteration of the lookup table, wherein the customizing table contains affixes that are common in persons names;
      identifying a next entry in the lookup table using an index value associated with the permutation of the name associated to the selected first value according to the comparison to the customizing table, if the index value of the identified next entry is an exit condition, exit the comparison of the customizing table;
      if the identified next entry has an index value assigned to a permutation of the input string, making a comparison between the next entry from the lookup table and the customizing table, selecting second values from the customizing table based on a result of the comparison;
      searching the database for the name input into the input field using, if the index value of the identified next entry was an exit condition, the selected first value, otherwise, using the selected first and second values;

returning a result list comprised of the first values and the second values selected from the database; and presenting the result list to the display device.

14. A system according to claim 13, wherein the lookup table contains string values.

15. A system according to claim 13, wherein the index values are numbers used to determine the next string value to search in the lookup table if a current string value is not found in the customizing table.

16. A system according to claim 13, wherein the first values are parts of a name.

17. A system according to claim 13, wherein the first values are associated with words within the first character string.

18. A system according to claim 13, wherein the each first value is an affix.

19. A system according to claim 13, wherein the words in the character input string that are not found in the customizing table are last names.

20. A system according to claim 13, wherein the second values are names.

21. A system according to claim 20, wherein the second values are information corresponding to the names.

22. A computer readable storage medium containing instructions that when executed result in a performance of a method comprising:

receiving a name as a character input string, the name comprising an affix and at least one of a first name, a second name, and a last name;

parsing the character input string taken from the one input field into a plurality of permutations of the character input string;

in response to the parsing, creating a lookup table having each of the plurality of permutations of the character input string parsed from the character input string;

iterating through the lookup table, the lookup table having an index value associated with each of the plurality of permutations of the character input string, the index value pointing to a next entry in the lookup table;

based on a successful comparison between the permutation of the input string in the lookup table and a customizing table, selecting first values from the customizing table including values related to the character input string permutation on the iteration of the lookup table, wherein the customizing table contains affixes that are common in persons names, wherein the customizing table contains affixes that are common in persons names;

identifying a next entry in the lookup table using an index value associated with the permutation of the character input string according to the comparison to the customizing table, wherein if the index value of the identified next entry is an exit condition, exit the comparison of the customizing table;

if the identified next entry has an index value assigned to a permutation of the input string, making another comparison between the next entry from the lookup table and the customizing table, selecting second values from the customizing table;

searching a database for the character input string input into the input field using, if the index value of the identified next entry was an exit condition, the selected first value, otherwise, using the selected first value and the selected second value;

returning a result list from the database; and presenting the result list on an output device.

23. A computer readable storage medium according to claim 22, wherein the lookup table contains string values.

24. A computer readable storage medium according to claim 22, wherein the index values are numbers used to determine the next input string value to search in the lookup table if a current input string value is not found in the customizing table.

25. A computer readable storage medium according to claim 22, wherein the first values are parts of a name.

26. A computer readable storage medium according to claim 22, wherein the first values are associated with words within the first character input string.

27. A computer readable storage medium according to claim 22, wherein the each first value is an affix.

28. A computer readable storage medium according to claim 22, wherein the words in the first character input string that are not found in the customizing table are last names.

29. A computer readable storage medium according to claim 27, wherein the second values are names.

30. A computer readable storage medium according to claim 29, wherein the second values are information corresponding to the names.

31. The system of claim 13, wherein the lookup table includes every permutation of the first character input string.

32. The system of claim 13, further comprising a name database, wherein the customizing table includes all name affixes from the name database.

33. A search method, comprising:

parsing an input text string into a plurality of discrete search terms in an order of text flow as the text string is input into a single text field, wherein the input text string comprises an affix and at least one of a first name, a second name, and a last name;

creating a lookup table using the search terms, comprising:

providing entries to the lookup table for each of the search terms and further entries for combinations of the search terms in order of text flow, within each entry storing a first search term or combination of search terms, providing an index pointer referring to another entry of the lookup table that stores remaining search terms in the order of text flow, searching a customizing table data set using recursive search queries taken from the lookup table, starting with a first entry of the lookup table, wherein the customizing table contains affixes that are common in persons names, the searching comprising:

retrieving search term(s) from a current entry of the lookup table, search the customizing table data set using a search query based on the retrieved search terms, wherein the search terms include a second character input string, if the search query hits the data set, retrieve the index pointer of the current entry, if the retrieved index pointer indicates a termination condition, end the recursive search, if the retrieved index pointer identifies another entry in the lookup table, advance operation of the recursive search to the pointed to entry, if the search query misses, advance operation of the recursive search to the next entry of the lookup table in order, repeat using the next entry of the lookup table as the current entry;

upon reaching a termination condition or a condition where the next entry in the lookup table is the last entry, retrieve data from a database based on the hits from the data set; and outputting the retrieved data to an output device.

34. The method of claim 33, wherein the lookup table includes every permutation of the first character input string.

35. A computer-readable storage medium embodied with computer program instructions for causing a computer to execute a search method, method preformed by the computer comprising:

parsing an input text string into a plurality of discrete search terms in an order of text flow as the text string is input into a single text field, wherein the input text string comprises an affix and at least one of a first name, a second name, and a last name;

creating a lookup table using the search terms, comprising:
providing entries to the lookup table for each of the search terms and further entries for combinations of the search terms in order of text flow,
within each entry storing a first search term or combination of search terms, providing an index pointer referring to another entry of the lookup table that stores remaining search terms in the order of text flow,
searching a customizing table data set using recursive search queries taken from the lookup table, starting with a first entry of the lookup table, wherein the customizing table contains affixes that are common in persons names, the searching comprising:

retrieving search term(s) from a current entry of the lookup table, search the customizing table data set using a search query based on the retrieved search terms, wherein the search terms include a second character input string, if the search query hits the data set, retrieve the index pointer of the current entry, if the retrieved index pointer indicate a termination condition, end the recursive search, if the retrieved index pointer identifies another entry in the lookup table, advance operation of the recursive search to the pointed to entry, if the search query misses, advance operation of the recursive search to the next entry of the lookup table in order, repeat using the next entry of the lookup table as the current entry;

upon reaching a termination condition or a condition where the next entry in the lookup table is the last entry, retrieve data from a database based on the hits from the data set; and outputting the retrieved data to an output device.

* * * * *